(12) United States Patent  
Kilgore

(10) Patent No.: US 6,643,493 B2  
(45) Date of Patent: Nov. 4, 2003

(54) APPARATUS AND METHOD FOR REGISTERING STUDENTS AND EVALUATING THEIR PERFORMANCE

(76) Inventor: Kevin P. Kilgore, 4036 Deerwood Pl., Eagan, MN (US) 55122

( * ) Notice: Subject to any disclaimer, the term of this patent is extended or adjusted under 35 U.S.C. 154(b) by 158 days.

(21) Appl. No.: 09/908,755

(22) Filed: Jul. 19, 2001

(65) Prior Publication Data

US 2003/0017443 A1 Jan. 23, 2003

(51) Int. Cl.[7] ................................................. G09B 3/00
(52) U.S. Cl. ..................................... 434/350; 434/322
(58) Field of Search ............................... 434/322, 323, 434/350, 362, 236, 307 R

(56) References Cited

U.S. PATENT DOCUMENTS

| | | |
|---|---|---|
| 5,182,705 A | 1/1993 | Barr et al. |
| 5,270,920 A * | 12/1993 | Pearse et al. ................. 705/8 |
| 5,696,702 A | 12/1997 | Skinner et al. |
| 5,706,441 A | 1/1998 | Lockwood |
| 5,748,907 A | 5/1998 | Crane |
| 5,845,254 A | 12/1998 | Lockwood et al. |
| 5,904,485 A * | 5/1999 | Siefert .......................... 434/322 |
| 5,924,073 A | 7/1999 | Tyuluman et al. |
| 5,934,909 A * | 8/1999 | Ho et al. ...................... 434/362 |
| 5,963,914 A | 10/1999 | Skinner et al. |
| 5,974,389 A | 10/1999 | Clark et al. |
| 6,061,506 A | 5/2000 | Wollaston et al. |
| 6,067,537 A | 5/2000 | O'Connor et al. |
| 6,078,894 A | 6/2000 | Clawson et al. |
| 6,146,148 A * | 11/2000 | Stuppy ......................... 434/322 |
| 6,148,297 A | 11/2000 | Swor et al. |
| 6,151,581 A | 11/2000 | Kraftson et al. |
| 6,182,047 B1 | 1/2001 | Dirbas |
| 6,315,572 B1 * | 11/2001 | Owens et al. ................ 434/322 |

* cited by examiner

Primary Examiner—Mahmoud Gimie  
(74) Attorney, Agent, or Firm—Thomas J. Nikolai; Nikolai & Mersereau, P.A.

(57) ABSTRACT

A method for registering students in courses and generating, collecting, processing and reporting student performance is provided. The process involves the use of a database including information related to institutions, the courses they offer and their faculty to register students for courses periodically inputting student performance data into the database and using the database to analyze the data and provide periodic reports related to student performance.

12 Claims, 7 Drawing Sheets

FIG. 2

Records for Marc Green

| Profile | PreTest | Worksheet | Proc. Log | Final Exam | Grades |

Faculty: Finnell, John T ▼    11/23/99    ☑ Previewed    Case No. [3]

Attitude: ○ outstanding   ⦿ excellent   ○ satisfactory   ○ marginal   ○ review

Collection: ○ outstanding   ○ excellent   ⦿ satisfactory   ○ marginal   ○ review Synthesis: ○ outstanding   ○ excellent   ⦿ satisfactory   ○ marginal   ○ review Comment: Trying hard. Long Presentations - discussed shortening.

☐ Private

Record: ◁◀ 1 ▶▶▷* of 18

[Report]    [Ranking]

Directory - Current Students

| Name: | Start Date: | School: | Grade: |
|---|---|---|---|
| Benton, Peter J | 9/12/96 | University of Minnesota | satisfactory |
| Carter, John I | 10/23/97 | University of Washington | excellent |
| Green, Marc C | 9/22/96 | Loyola University of Chicago, Stritch | outstanding |
| Weaver, Carrie D | 11/18/96 | University of NC at Chapel Hill | excellent |

⦿ Current   ○ Completed

A B C D E F G H I J K L M
N O P Q R S T U V W X Y Z

[ All ]
[ New ]

APPARATUS AND METHOD FOR REGISTERING STUDENTS AND EVALUATING THEIR PERFORMANCE

BACKGROUND OF THE INVENTION

I. Field of the Invention

The present invention relates to the administration of an educational program. More specifically, the present invention provides a computer-based system for processing registration, tracking and student performance data and generating reports related to a student's performance.

II. Background of the Invention

Many professional schools require students to participate in on-the-job training programs generically referred to as clinical rotations or externships. For example, the third and fourth year of most medical school programs involve engaging students in an externship comprising a variety of rotations involving different aspects of the practice of medicine. A typical emergency medicine rotation, for example, consists of 17 clinical shifts, 8 hours of didactic conference, 4 one and one-half hour procedural workshops, and an emergency medical service "ride along". Students may also be given written tests. During the rotation students are directly supervised by several different attending physicians. The student's final grade for the rotation is based not only on test results, but also on an evaluation of the student's performance during clinical shifts, conferences, workshops and the EMS ride along. Compiling evaluation data from so many sources can be a time-consuming and difficult task.

Significant difficulties are associated with scheduling students into rotations, collecting evaluation data and processing the evaluation data to give accurate and timely assessments of student progress. This is true for most externship programs, but these problems are particularly acute with respect to medical training because medical schools typically partner with a variety of teaching hospitals, teaching hospitals partner with more than one medical school, and the medical schools partner with each other.

In view of the foregoing, there is a real need for an effective, timely and efficient method for registering and tracking students, generating evaluation data, collecting the evaluation data, storing the data, and reporting the data on a timely, as needed, basis.

SUMMARY OF THE INVENTION

Currently there are available a variety of relational database software packages for use on computers. Such software packages are sold by Microsoft, Inc. of Redmond, Wash. under the trademark Microsoft Access and by Borland Software Corporation of Scotts Valley, Calif. under the trademark PARADOX. Oracle Corporation of Redwood Shores, Calif. manufactures very powerful relational database software.

Relational database software products have various features in common. Generally speaking, they permit users to create a plurality of tables on which data is stored. The tables will generally have common fields and the software uses these common fields to relate the data in one table to the data in another table. Users can develop easy-to-use input screens so that the data input into the database is stored in the proper table. Such software allows the user to develop queries so that data from various tables can be studied. Such queries can then be used to create reports based upon data stored in the tables.

The present invention utilizes relational database software (or SQL database software) to store evaluation data, analyze evaluation data and generate reports on student performance.

To access the power of the database software and to provide an efficient scheduling and evaluation system, various types of data must be input, stored and processed by the computer.

In the context of medical training, medical schools and teaching hospitals are the institutions that provide training. Students typically receive training from several different institutions. Such institutions employ a number of different people who deliver the training. Some of these people are also involved in advisement and evaluation of student performance.

There is no single course of study undertaken by medical students. Each student's training is, to some extent, unique. Medical schools offer a variety of courses and teaching hospitals offer a variety of rotations for which a student might register. Not all courses and rotations are offered during all sessions. Different institutions have different schedules for courses and rotations. Sometimes the rotations for the various institutions overlap. All of this greatly exacerbates scheduling difficulties. Also, evaluation and reporting becomes more difficult when student performance in multiple courses and rotations from multiple institutions all needs to be evaluated. With careful planning and implementation, the use of a relational database can prove to be very useful.

In a relational database, data is stored in tables and relationships are created between tables to link data in the different tables together. In the present invention, the tables can be divided into four broad categories. Data related to the institutions, their faculty, the courses or rotations they offer, and the schedules for the courses fall into a first group. The second group of tables contains personal information related to the student. The third group of tables cooperates with the first and second group of tables for scheduling students into classes and rotations. The final group cooperates with the other three groups for evaluating student performance. The power of the relational database makes more efficient scheduling and reporting of performance possible.

With respect to student evaluation, data generated through the evaluation process can be entered into the tables at the time each separate evaluation is completed. The software can then be used to generate periodic reports based upon the data input into the database or selected portions thereof. Such reports can be given to the student and any of the institutions involved in training the student. Some of the data will be in the form of test results. Some of the data will also relate to the performance of the student during clinical shifts, conferences, workshops or the like. Anecdotal data or other comments can be included in the evaluation, stored in the database and presented in reports.

In view of the foregoing, it should be clear that a principal object of the present invention is to provide an effective system for registering students, collecting evaluation data on student performance, storing said data, processing said data and reporting said data.

Another object of the present invention is to provide a system for collecting and storing data on a real-time or near real-time basis to improve the accuracy and efficacy of the registration and evaluation processes.

Another object of the present invention is to provide a comprehensive registration system along with an efficient and timely system for evaluation of student performance.

Still another object of the present invention is to provide a system which permits the efficient production of periodic performance reports.

Another object of the present invention is to provide performance reports that are both timely and capable of delivering an effective and clear assessment of overall performance as well as particular areas of performance that have been evaluated.

These and other objects of the present invention will become more clear from the following detailed description of the preferred embodiments, particularly when read in conjunction with the drawings which form a part of this specification.

BRIEF DESCRIPTION OF THE DRAWINGS

FIG. 2 is a student profile form for entering and reviewing biographical data related to a student.

FIG. 3 is a form for entering and reviewing evaluation data related to student performance.

FIG. 4 is a form for entering and reviewing a data log relating to procedures performed by the student FIG. 5 is a form for entering data related to student performance on a test.

FIG. 6 is a form for reporting student performance; and

FIG. 7 is a form for reviewing grade information for a student.

DETAILED DESCRIPTION OF THE PREFERRED EMBODIMENTS

Figure 1:
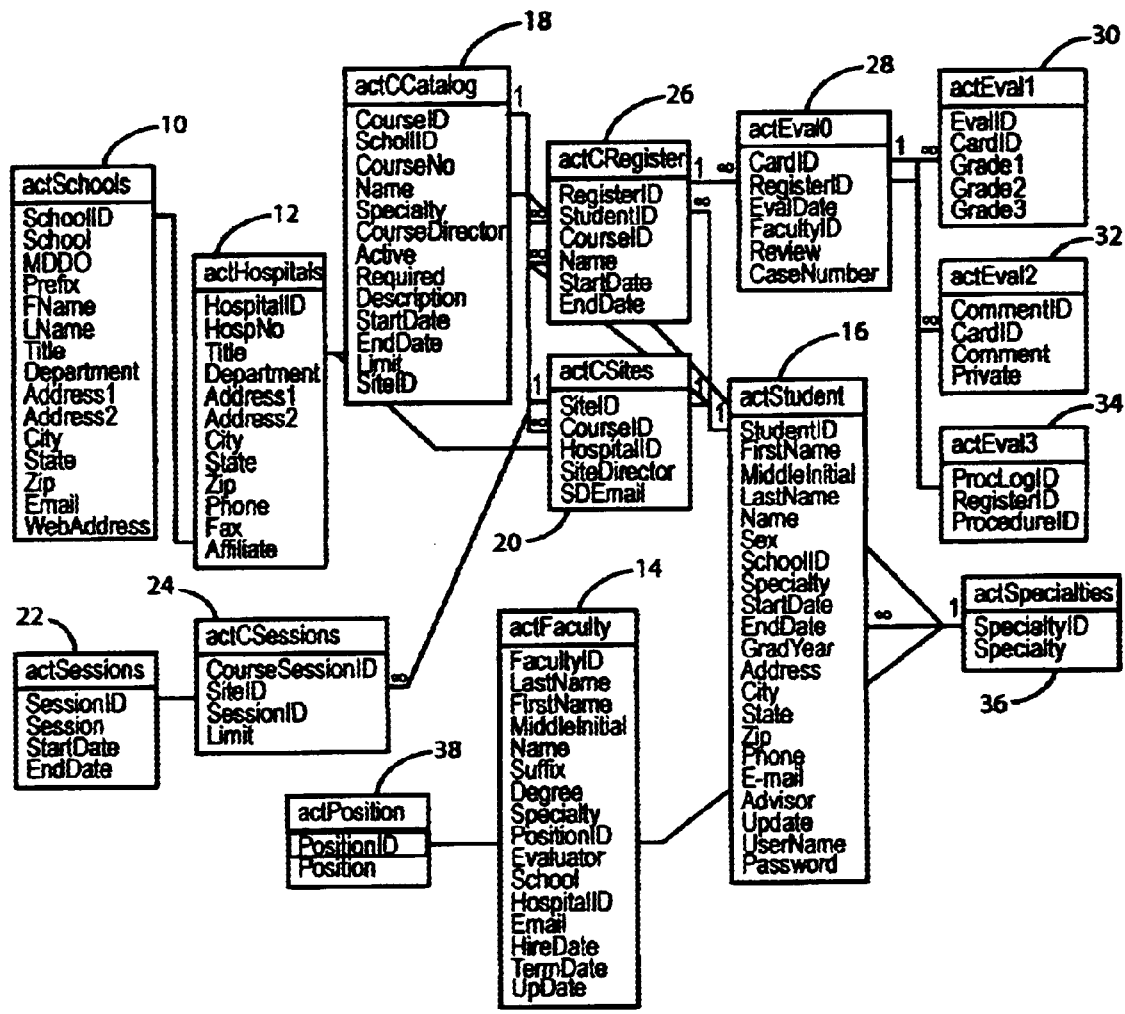
FIG. 1 is a chart showing a plurality of tables which make up a relational database of the present invention.

The principal advantages of the present invention are derived from the use of a computerized relational (SQL) database to record, store and report registration data and evaluation data. The database consists of a collection of tables. Each table has a unique name. The tables share a key data element that is used to link the tables together.

Proper design of the database is essential. The place to begin is with an assessment of what training is to be offered and what student performance data needs to be reported. Once this assessment is complete, an outline of data points that are necessary to properly register students and produce the desired student performance reports can be created. With this outline in hand, one can consider how the necessary data will best be collected and can organize a table structure for the database accordingly.

The present invention provides a mechanism for efficiently collecting and reporting data related to student registration and performance. This invention can be applied to a variety of educational programs. To meet the disclosure requirements of the patent laws, the example used to describe the invention will relate to the registration and evaluation of medical students.

FIG. 1 shows a preferred table structure for the registration and evaluation system of the present invention. This table structure includes four general information tables. These are tables 10, 12, 14 and 16.

Table 10 is used to store general information related to medical schools. Information in this table includes the name of the school, address information, and the like. Each school has a Unique School ID used to associate information in other tables with a particular school.

Table 12 is used to store information related to hospitals. Such information includes the name, address, phone number and the like for the hospitals. Each hospital is assigned a Unique Hospital ID. The Hospital ID is used to associate information in table 12 with data in other tables.

Table 14 is used to store general information related to faculty members. Each faculty member is given a unique ID which is used to relate the data in table 14 to the data in other tables. Table 14 also includes such data as the name of each faculty member, the degrees they hold, their specialty, the position they hold, their e-mail address and the like. The institutions (i.e., schools or hospitals) with which the faculty member is affiliated is also listed in table 14 using the Unique School ID and Hospital ID. When entering the School ID in table 14, table 10 serves as a look-up table. Similarly, table 12 serves as a look-up table when completing the Hospital ID field in table 14.

Table 16 is used to store personal information related to students. Each student is assigned a Unique Student ID. Information such as the student's name, sex, address, phone number, and e-mail address are associated with the Student ID in table 16. Table 16 also lists the student's proposed area of specialty and advisor as well as the student's start date, end date and graduation year. The School ID of the school the student attends is listed in table 16. Again, table 10 serves as a look-up table when completing this field of table 16. Table 16 is also used to store a unique user name and password for the student. The student uses the user name and password when registering for courses or checking grades.

In a medical training program, a number of different courses are offered. Data related to the various courses offered are stored in a catalog table 18. Each course is assigned a Course ID. Each course is associated with a school using the School ID for the school offering the course. Table 18 also includes data related to the course number, the name of the course, the course director, an indication of whether the course is required, a description of the course, the stat date and end date of the course and the limit on the number of students who can participate in the course. Table 18 also includes a Site ID that defines the site where the course is offered.

The Site ID is used to link the course to the hospitals where the course rotation is offered. This is done using table 20. More specifically, table 20 uses the Site ID, Course ID and Hospital ID fields to link the individual courses (i.e., rotations) to the hospitals where various rotations are offered. The site director's name and e-mail address are also listed in table 20.

Table 20 is also used to link the courses and hospitals to other important scheduling data. For example, table 22 contains data related to the starting and ending dates of various sessions. Each session has a Unique Session ID. Table 24 associates this date information using the Session ID with a site using the Site ID and Session ID fields.

Registration of students is based upon virtually all the tables described above. Specific registration information is stored in table 26. Table 26 associates a Student ID with a Course ID, the site at which the course is offered and the start date and end date for the courses. In this context, the student registers using a drag-and-drop process. Courses having available space are listed. The student selects from those listed. Data related to the student's selection is listed in table 26.

One aspect of table 26 that is significant to the evaluation process is that a Unique Register ID is associated with a specific student. The Register ID is used to associate the evaluation data with the student.

In the system of the present invention, evaluation cards are used to initially record evaluation data related to student performance. Certain data is recorded in table 28 related to each card. This data includes a Unique Card ID, the evaluation date, the Faculty ID of the faculty member performing the evaluation, a case number associated with the evaluation card, and a review field. The cards typically include a plurality of grades and a comment section. The grades are stored along with the Card ID in table 30. The comments are stored along with the Card ID in table 32. Using the Faculty ID, the card is associated with the particular faculty member performing the evaluation. The card is associated with the student using the Register ID.

Effective medical training requires that student's experience a variety of procedures. Therefore, the system of the present invention provides a procedure log for each student. Table 34 is used to store a list of procedures performed by a student. Specifically, table 34 does this by associating the one or more Procedure ID of each procedure performed by the student with the Register ID of the student who performed the procedure.

Two other tables are shown in FIG. 1. These are drop-down tables 36 and 38. Table 36 is used to list all of the available specialties. When specialty data is entered in table 16 for a new faculty member, the person inputting the data chooses from the list provided in table 36. Similarly, table 38 lists the various positions a faculty member can hold. When someone is entering data related to a faculty member in table 14, and more specifically in the Position ID field of table 14, the position information in table 38 is used.

Those skilled in the art will recognize that other tables can be added or additional fields can be added to the tables shown. For example, if written pre-tests, and mid-term tests, or final examinations are included as part of the system, one or more tables can be used to associate grades on these tests with a particular student.

Those skilled in the art will recognize that data can be directly entered into a table and the tables can be viewed to review the data. However, the tables are not easy to use either for data input or data review. Data entry forms are, therefore, created to provide an easy and logical way to input data into the tables. These forms also provide an attractive, easy-to-read mechanism for reviewing the data. These forms can be created once the table structure of the database has been determined.

The forms include a plurality of fields that correspond to the fields of the tables. The fields of the forms can be designed to restrict the data that can be entered and to assist the data entry process. Some fields, such as those related to biographical information or for comments, will typically be free-text fields where the data is typed in free form. Other fields of the forms are more limited. Some are just boxes to be checked, others include drop-down lists so that the user must select from the list. Proper form design will minimize typing and the time required to input the data.

Figure 2:
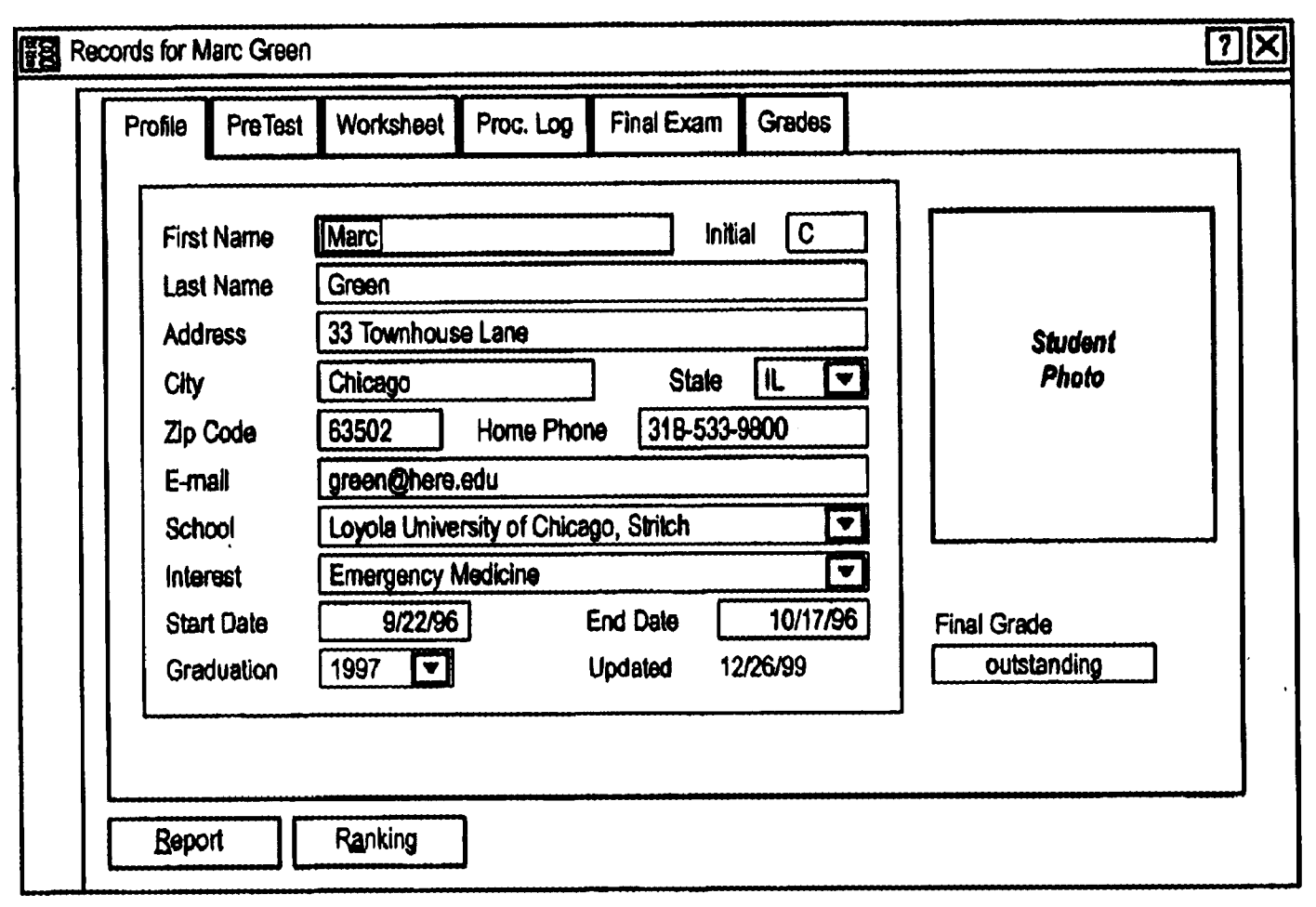
Figure 4:
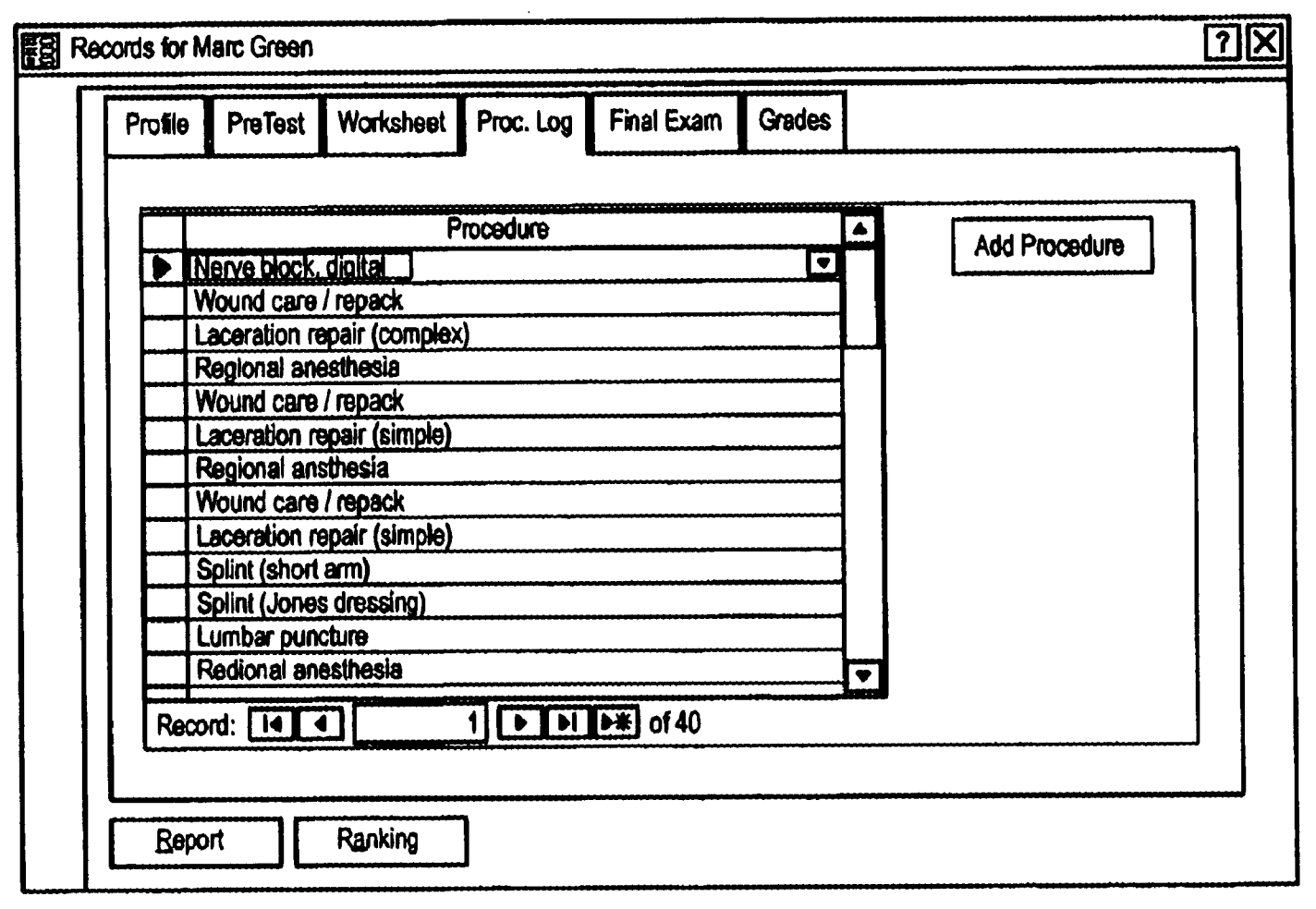
Figure 5:
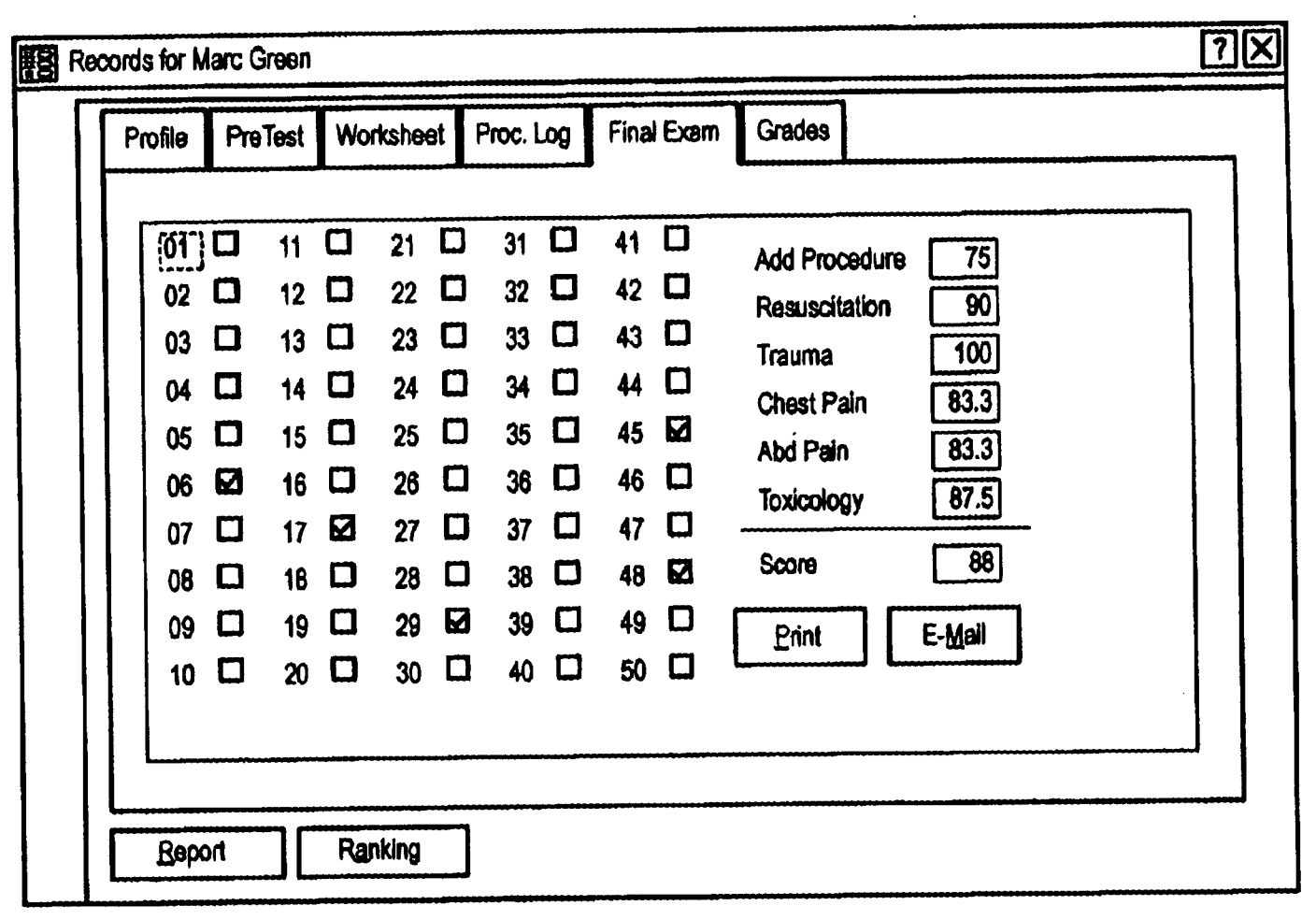

FIGS. 2–5 are examples of such forms. The form shown in FIG. 2 is used to input and display much of the data for table 16. FIG. 3 shows the evaluation forms used to collect and display data related to daily evaluations. FIG. 4 shows the form used to collect and display data related to the procedures performed by the student. FIG. 5 is a form that might be used to collect and display data related to the student's performance on a final examination.

The manner in which information can be entered or reviewed will now be discussed with reference to FIG. 3. As indicated above, FIG. 3 is an example of a form that can be used to enter data related to a student's performance. The form is specifically used to record a faculty assessment of a student's performance during a hands-on procedure. Data entered using the form shown in FIG. 3 is stored in tables 28, 30 and 32. Similarly, data displayed in the form shown in FIG. 3 comes from these three tables. The form includes the identity of the faculty member who performed the evaluation, the date of the evaluation, the case number of the case evaluated and an indication of whether the case was reviewed by the faculty member. All of the data ends up in table 28. The form of FIG. 3 also includes an evaluation of student performance in three areas: attitude, collection of information, and synthesis of the information. The student's grades in these three areas are recorded in table 30. The form of FIG. 3 also includes an area for comments and a box to check if the comment is private. This date is recorded in table 32. A faculty member can quickly and easily complete the form shown in FIG. 3 using a computer associated with the database. Preferably the computer will have a mouse and a keyboard. Using the mouse, the faculty member selects his name from the drop-down menu next to the word "faculty", the date is automatically supplied. If necessary, the date can be changed by the faculty member using the keyboard. The faculty member then uses the mouse to "click" the "reviewed" box and the appropriate grade associated with "attitude", "collection" and "synthesis". The faculty member can type in any comments and "click" the "private" box if the comments are not to be shared. The whole data entry process using the form of FIG. 3 takes less than a minute.

Figure 6:
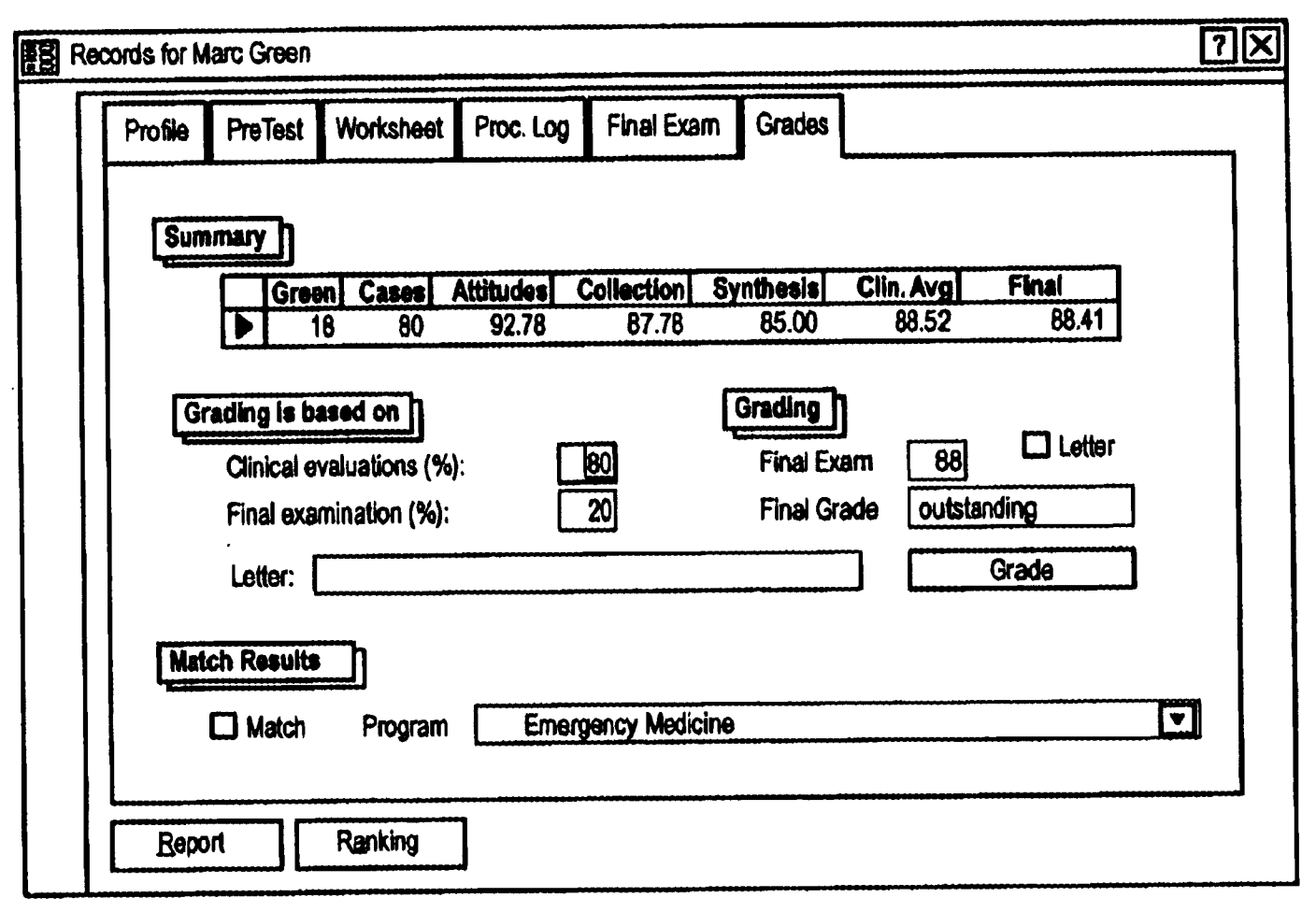

FIG. 6 is an example of a report that might be given to a student related to the assessment of the student's performance during a rotation. The report provides a summary listing the number of evaluation cards (see FIG. 3) completed, the number of cases completed, the averages of the grades on assessments of attitude, collection and synthesis related to clinical procedures, an overall average of the assessments, and a final grade for the rotation. The report in FIG. 6 also shows the grade on a final examination and how the clinical evaluations and final examination grade were weighted to arrive at the overall grade for the rotation.

FIG. 7 is an example of a report that can be created by the database. Such a report might be used by course director of a particular rotation to review the performance of the students currently enrolled. The report lists the students by name, the start date of the students, the school they attend and their grade.

The most important function of the database is to assemble the data that has been collected in an organized fashion to produce such reports. Such reports can be summary reports (see FIG. 7) or far more detailed reports. Standard reports can be created and, in the example, distributed to the student during the course of the rotation to provide a more "real-time" progress report so that remedial actions can be taken to improve performance. The school where the student is enrolled, or anyone else who has a need for such a report can also be supplied with standard or, as explained further below, specially designed reports.

One of the benefits of a relational database is that, in addition to standard reports, the data can be analyzed using queries. Queries allow the user to look at particular pieces of data in many different ways. Queries can be used to perform record retrieval and updates, perform calculations, append data to tables, or summarize data in one or more tables. Using queries, a user with a question can specify the criteria for a search and then automatically sort and display all records matching the criteria. For example, with the database shown in the drawings and described above, a query can be used to generate a list of all students interested in emergency medicine by searching the "specialty" field of table 16. The query can then easily be modified to generate a report of all students interested in emergency medicine also having particular grades using not only the "specialty" field on table 16, but also data from table 30.

The database can be equipped with other features. Such features include password protection schemes having different security levels for different users. To ensure security of student data, a faculty member may be permitted to enter data only related to an evaluation conducted by the faculty member, but restricted from reviewing, or editing, or printing other data. The database can also be coupled to other software for data entry purposes. For example, voice recognition software can be used for data entry rather than or in addition to a keyboard and mouse. The database can also be used in conjunction with an e-mail system to deliver an electronic version of periodic reports as opposed to a hard copy. The database can also be used to track and evaluate trends in faculty evaluations through the use of appropriate queries and reports.

The database described above is, of course, a tool which assists in the registration and evaluation processes. A description of one way to use the system as part of a comprehensive evaluation process will now be provided.

During student orientation, a new record is started for each student by entering biographical information using the form shown in FIG. 2. The student, using a computer, then registers for a rotation based upon data stored in tables 10–24. A Registration ID is assigned and associated with the Student's ID of the student, the Course ID of the rotation, the name of the rotation, the hospital site at which the rotation is to take place and the start and end dates of the rotation. This data is stored in table 26. At this same time, a 50 question pre-test may be taken by the student, graded using the system, and a report can be generated by the system and sent by e-mail to the student.

During the rotation, the student works a plurality of shifts. An attending physician, who is a faculty member, directly supervises the student's clinical activities during each shift. The faculty member, at the end of each shift, completes an evaluation card (see FIG. 3). The evaluation card requires the faculty member to grade the student's abilities in interpersonal relations (i.e., attitude), data acquisition and data synthesis. The faculty member can also provide comments in a free-text form. Entry of this evaluation data can be completed in less than a minute because most data is entered using drop-down lists or by marking "option buttons". At the same time, the faculty member can identify procedures performed by the student using the form shown in FIG. 4. To reduce data entry time, a drop-down list is used to enter the procedures performed.

As a student progresses through the rotation, the daily evaluations are used to follow the student's progress. Each student may request to review the evaluations completed to date with one of the directors of the program. Reports can be easily generated from the daily evaluation data for review at such a meeting. Alternatively, such reports can be e-mailed to the student. A student can review his or her evaluation data using the user name and password entered for the student in table 16.

At the end of the rotation students are typically given a final exam. The examination is scored by marking incorrect answers using the form shown in FIG. 5. The database automatically calculates and stores the final grade. See FIG. 5.

As should be clear from the foregoing, the present invention provides a mechanism for registering students and evaluating student performance which is easy to use, thorough, efficient and capable of providing timely periodic reports related to student performance. The description set forth above is not intended to be limiting. Instead, it is intended to provide a sufficient understanding to enable those skilled in the art to practice the invention. Those skilled in the art will be able to make modifications without deviating from the invention which is defined by the following claims.

What is claimed:

1. A process for evaluating the performance of students on a regular basis on clinical tasks to be completed by the students comprising:
   a. storing in a database information regarding students including courses in which said students are enrolled;
   b. developing a set of criteria to be evaluated; said criteria related to clinical tasks to be performed by students in the courses in which the students are enrolled;
   c. developing a set of forms to be used by faculty members to record data corresponding to the student's performance on said clinical tasks with respect to the criteria to be evaluated;
   d. having said faculty members use said forms to record said data;
   e. using said forms to input said data into a computerized database; and
   f. using said database to store and process said data and to provide periodic reports related to the performance of students with respect to said criteria to be evaluated on clinical tasks completed by the students in the courses in which the students are enrolled.

2. The process of claim 1 wherein said computerized database includes a plurality of tables.

3. The process of claim 2 wherein one of said tables includes biographical information.

4. The process of claim 1 wherein data is collected with respect to the student's performance in carrying out a number of distinct tasks.

5. The process of claim 4 wherein the data related to each of said number of distinct tasks is recorded in fields in said relational database.

6. The process of claim 1 wherein some of said data relates to scores on written tests taken by the student.

7. The process of claim 1 wherein some of said data relates to scores on practical exercises performed by the student.

8. The process of claim 1 wherein some of the data constitutes anecdotal comments of instructors.

9. The process of claim 1 wherein said data is collected and stored in the database on a periodic basis.

10. The process of claim 5 wherein said data is stored in said database at the time the evaluation of the student's performance occurs.

11. The process of claim 1 wherein at least one of said reports is delivered to the student by e-mail.

12. A process for enrolling students in courses and evaluating the clinical performance of students enrolled in said courses comprising:
   a. storing in a computerized database information related to institutions offering courses, the courses offered by each of said institutions, the faculty members teaching said courses, and the schedule for said courses;
   b. developing a set of evaluation criteria to be used in evaluating student clinical performance in said courses;
   c. developing at least one evaluation form to be used by faculty members to record data corresponding to stu dent clinical performance with respect to said evaluation criteria;

d. storing information related to students in said database;
e. using said database to enroll students in courses;
f. storing information related to a particular course in which a particular student is enrolled in said database;
g. using said evaluation form to record data related to the clinical performance of said student in a course in which said student is enrolled;
h. inputting said recorded data related to the clinical performance of said student into said database;
i. using said database to store and process said data related to the clinical performance of said student; and
j. using said database to provide periodic reports related to the clinical performance of said student in a course in which said student is enrolled with respect to said criteria to be evaluated.

* * * * *